United States Patent [19]
Steltenkamp et al.

[11] Patent Number: 4,715,970
[45] Date of Patent: * Dec. 29, 1987

[54] WASH CYCLE ADDITIVE ANTISTATIC COMPOSITION FOR TREATMENT OF LAUNDRY, PROCESS FOR MANUFACTURE OF SUCH COMPOSITION AND METHOD OF USE THEREOF

[75] Inventors: Robert J. Steltenkamp, Somerset; Michael A. Camara, Jackson, both of N.J.

[73] Assignee: Colgate-Palmolive Company, New York, N.Y.

[*] Notice: The portion of the term of this patent subsequent to Oct. 28, 2003 has been disclaimed.

[21] Appl. No.: 939,313

[22] Filed: Dec. 8, 1986

Related U.S. Application Data

[63] Continuation-in-part of Ser. No. 883,193, Jul. 8, 1986, which is a continuation of Ser. No. 734,508, May 16, 1985, Pat. No. 4,619,775.

[51] Int. Cl.$^4$ ............................................. C11D 3/32
[52] U.S. Cl. ............................ 252/8.8; 252/8.75; 252/135; 252/174.14; 252/174.25; 252/544; 252/546
[58] Field of Search ............ 252/8.8, 8.75, 541, 252/544, 546; 546/525; 564/153; 260/404.5

[56] References Cited

U.S. PATENT DOCUMENTS

| | | | |
|---|---|---|---|
| 4,440,666 | 4/1984 | Miller et al. | 252/392 |
| 4,619,775 | 10/1986 | Steltenkamp et al. | 252/541 |
| 4,626,429 | 12/1986 | Robbins et al. | 424/70 |

*Primary Examiner*—Paul Lieberman
*Assistant Examiner*—Hoa Van Le
*Attorney, Agent, or Firm*—M. M. Grill; H. S. Sylvester; N. Blumenkopf

[57] ABSTRACT

A wash cycle additive antistatic composition, which, when added to a wash water in a washing machine, makes laundry washed in such automatic washing machine and dried in an automatic laundry dryer resistant to the accumulation of static charges thereon, and which may be in particulate, liquid or other suitable form, comprises an antistatic polyamide of trialkylacetic acid and polyamine, wherein the alkyls of the trialkylacetic acid moiety are of 1 to 10 carbon atoms each and the polyamine moiety contains from 2 to 5 amino groups, and a particulate carrier or liquid medium for the polyamide, which is a detergent builder or filler, or is an aqueous medium containing a nonionic surface active agent.

20 Claims, No Drawings

WASH CYCLE ADDITIVE ANTISTATIC COMPOSITION FOR TREATMENT OF LAUNDRY, PROCESS FOR MANUFACTURE OF SUCH COMPOSITION AND METHOD OF USE THEREOF

This application is a continuation-in-part of our U.S. patent application Ser. No. 883,193, filed July 8, 1986, which is a continuation of our application Ser. No. 734,508, filed May 16, 1985, now U.S. Pat. No. 4,619,775, issued Oct. 28, 1986.

This invention relates to wash cycle additive antistatic compositions which, when added to the wash cycle during automatic washing machine washing of laundry, make the washed laundry antistatic, even after it is dried in an automatic laundry dryer. More particularly, the invention is of such compositions which contain, as an antistatic agent, an antistatic polyamide of trialkylacetic acid and a polyamine, or a mixture of such polyamides. The invented compositions may be in particulate, liquid or other suitable form. The invention also relates to a process for manufacturing such a wash cycle additive antistatic composition, and to the uses of such compositions.

The polyamide antistatic agents mentioned above are disclosed in our parent patent application Ser. No. 883,193 and in the patent issued on the parent application thereof. That application describes processes for the manufacture of such compounds, and teaches uses thereof in detergent compositions, as antistats. The application also describes the significant advantages of the mentioned polyamides over previously employed antistats, such as cationic compounds, e.g., quaternary ammonium halides, which react adversely with anionic detergents in wash waters. Additionally, the application describes various physical characteristics of the mentioned polyamides. Accordingly, it is incorporated in this application by reference.

The antistatic polyamides employed in making the compositions of this invention may be those of trialkylacetic acids (neoalkanoic acids) of 5 to 32 carbon atoms, preferably of fewer carbon atoms, such as neoalkanoic acids of 5 to 16 carbon atoms, e.g., neopentanoic, neoheptanoic, neononanoic, neodecanoic, neododecanoic, neotridecanoic and neotetradecanoic acids. Some of such neoacids (neopentanoic acid and neodecanoic acid) are presently being marketed by EXXON Chemical Americas and are described in a bulletin of such company entitled Neo Acids Properties, Chemistry and Applications (Copyright 1982). To manufacture the antistatic polyamides utilized in the present invention the neoacids may be reacted directly with a polyamine, which preferably includes 2 to 5 amino groups. The polyamines are preferably diamines or triamines. The preferred triamines are preferably alkylene polyoxyalkylene triamines, such is those sold by Texaco Chemical Company under the trademark Jeffamine ®. Of such materials Jeffamine T-403, which is of the formula $$A-\overset{\overset{\displaystyle CH_2(OCH_2CH)_xNH_2}{|}}{\underset{\underset{\displaystyle T}{|}}{\underset{\displaystyle CH_2(OCH_2CH)_zNH_2}{|}}}CCH_2(OCH_2CTH)_yNH_2$$

wherein A=ethyl, T=methyl, and $x+y+z=5.3$, is more preferred. The diamines have both amino groups thereof connected by an alkylene polyoxyalkylene moiety or by a lower alkylene group. Of the commercially available diamines containing oxyalkylene groups other Jeffamines are preferred, and the formula of such compounds is $$H_2N\overset{|}{\underset{T}{C}}HCH_2(OCH_2\overset{|}{\underset{T}{C}}H)_nNH_2.$$

In that formula T is methyl and n is in the range of 2 to 10, more preferably 2 to 7. Among such compounds which may be employed are: Jeffamine D-230, wherein n is an average of 2.6; Jeffamine D-400, wherein n is 5.6; and Jeffamine D-2,000, wherein n is 33.1. Of these diamines the most preferred is Jeffamine D-230. Among the non-alkoxylated diamines that are useful are alkylene diamines of 2 to 6 carbon atoms, such as ethylene diamine and hexamethylene diamine.

The polyamide antistats that are employed in the wash cycle additive antistatic compositions of the present invention, when alkoxylated, are of the formula selected from the group consisting of $$A-\overset{\overset{\displaystyle CH_2(OCH_2\overset{|}{\underset{T}{C}}H)_xNHCR}{|}}{\underset{\underset{\displaystyle CH_2(OCH_2CH)_zNHCR}{|}}{\underset{\underset{\displaystyle T \quad O}{|}}{}}}CCH_2(OCH_2CTH)_yNHCOR$$

and $$R\overset{O}{\overset{\|}{C}}NH\overset{|}{\underset{T}{C}}H-CH_2(OCH_2\overset{|}{\underset{T}{C}}H)_nNH\overset{O}{\overset{\|}{C}}R$$

wherein A is selected from the group consisting of alkyl of 1 to 20 carbon atoms and hydrogen, T is selected from the group consisting of methyl and hydrogen, R is a neoalkyl of 4 to 13 carbon atoms, n is from 1 to 40, and x, y and z are each numerals from 1 to 8, and total from 4 to 10. The non-alkoxylated polyamides employed are those of neoalkanoic acid and alkylene diamine of 2 to 6 carbon atoms, such as N,N'-ethylene-bis-neodecanamide and N,N'-hexylene-bisneodecanamide (or N,N'-1,6-hexane-bis-neodecanamide), but other diamides of neodecanoic acid and alkylene diamine of 2 to 6 carbon atoms are also useful. Preferred oxyalkylated polyamides are those of the formula previously given above wherein A is an alkyl of 1 to 4 carbon atoms, T is methyl, R is a neoalkyl of 4 to 9 carbon atoms, and x, y and z are each numerals from 1 to 3, which total from 4 to 8. Even more preferably, in such formula A is ethyl, R is neoalkyl of about 9 carbon atoms, T is methyl and x, y and z are each numerals from 1 to 3, the total of which averages about 5.3.

Preferably, in the formula $$R\overset{O}{\overset{\|}{C}}NH\overset{H}{\underset{|}{C}}CH_2(OCH_2\overset{|}{\underset{T}{C}}H)_nNH\overset{O}{\overset{\|}{C}}R,$$

T is methyl, R is neoalkyl of 4 to 9 carbon atoms and n is in the range of 2 to 10. More preferably R is neoalkyl of about 9 carbon atoms, T is methyl and n is about 5.6. When the polyamide is not oxyalkylated it is preferred to employ either N,N'-ethylene-bis-neoalkanamide or N,N'-hexylene-bisneoalkanamide, with the alkanamide more preferably being neodecanamide.

The wash cycle additive antistatic compositions of this invention are primarily employed for their antistatic effects but may also impart fabric softening to laundry items washed in a wash water containing such additive. The compositions are intended for employment with conventional built detergent compositions, which do not contain an antistat. Thus, the homemaker may add the present wash cycle additive composition to a wash water which contains a conventional built detergent composition, and the laundry washed with it will then become antistatic. By employing a wash cycle additive it becomes unnecessary for the person operating the washing machine to listen for the end of the wash cycle and then make a special trip to the laundry room to add fabric softener to the rinse. The polyamides of the present wash cycle additive compositions do not react adversely with anionic detergents, which are often present in conventional built detergent compositions, and therefore, detergency is not adversely affected by use of the present wash cycle additive compositions.

In addition to the polyamide active ingredient component of the present compositions, there will be present as a carrier, for the particulate composition embodiments of this invention, a water soluble or water insoluble builder and/or filler. Among the preferred water soluble builders are the polyphosphate, carbonate, bicarbonate, sesquicarbonate, silicate, sesquisilicate, polyacetal carboxylate and borate salts. Among the water insoluble builders those most preferred are the zeolites. The preferred fillers are sulfates, e.g., sodium sulfate. As examples of the phosphates there may be mentioned the polyphosphates, preferably sodium tripolyphosphate and tetrasodium pyrophosphate, although other water soluble phosphates and other builder salts, such as alkali metel salts, may also be employed. The polyacetal carboxylate utilized will normally have a molecular weight in the range of 3,000 to 15,000. The preferred zeolite is hydrated Zeolite A, which normally contains from 15 to 25% of moisture, as water of hydration.

In a preferred embodiment of the particulate composition aspect of the invention there may also be present bentonite powder, for its fabric softening activity. The bentonite employed is preferably a western or Wyoming bentonite, which is referred to as sodium bentonite and which is also sometimes called a swelling bentonite. Such material normally contains at least 2% of moisture and preferably at least 4% of moisture as moisture of hydration in the bentonite, and the presence of such moisture helps to make the bentonite effective as a fabric softener.

Various adjuvants may be present in the particulate wash cycle additive compositions, including colorants, perfumes, fluorescent brighteners, enzymes, antioxidants, stabilizers, bleaching agents and activators, binders and fluffing agents. Also, the product will contain a minor proportion of moisture.

The wash cycle fabric conditioning composition may be made in particulate form by blending particulate components of desired particle sizes. Normally, the composition will be of sizes in the range of No's. 8 to 140, U.S. Sieve Series, and preferably such will be in the range of No's. 10 to 100. Preferably, when making the particulate product, the builder or mixture of builders (with filler being optional) will be crutched and spray dried, after which the neoalkanamide, in liquid state (usually heated to above its melting point) will be mixed with or sprayed onto the spray dried detergent builder beads and will penetrate such beads and coat them. If bentonite is being employed, it (and any other powdered components, such as enzymes) may be mixed with the coated builder beads and may adhere to the surfaces thereof, to facilitate flow when such surfaces are tacky. Other components of the composition may be crutched with the builder and spray dried with it, if heat stable, or may be post-added, as may be preferred.

The proportions of components of the present particulate composition will normally be effective proportions for the purposes for which the components are added. Thus, in the charge of additive to the wash water, which is normally in the range of 0.1 to 2 g./l. for the described compositions, there will be enough antistat present to make the washed and dried laundry antistatic or free of static charge. The proportion of builder employed need not be a building proportion because builder will be present in the built detergent composition normally present in the wash waters of automatic washing machines. However, the builder in the additive, in addition to functioning as a carrier, also supplements the action of the builder in the detergent composition. When bentonite is present, it will be present in such proportion as to noticeably soften the washed and dried laundry. Normally, the proportion of polyamide will be in the range of 5 to 30% by weight, preferably 5 to 25% and more preferably 10 to 25%, in the particulate compositions. The proportion of builder or builder plus filler will normally be in the range of 50 to 95%, preferably 50 to 80%. When bentonite is present it will be from 10 to 25% of the composition, such as 15 to 20%.

The liquid fabric conditioning compositions according to this invention are preferably aqueous and include the polyamide in emulsified form rather than in solution because such polyamides are normally water insoluble. To assist in emulsifying or solubilizing the polyamide or a mixture thereof a nonionic surface active agent may be employed, preferably as an emulsifier for the polyamide. Among various suitable nonionic surface active emulsifiers (and nonionic detergents may function as emulsifiers) may be mentioned alkyl phenoxypolyoxyethylene ethanols, alkylaryl polyether alcohols, polyglycol esters, oxyethylated alkyl phenols, low molecular weight polyamides, monoglycerides, ethoxylated fatty alcohols, ethoxylated fatty acids, fatty alkylolamine condensates, fatty alkanolamides, and many other nonionic emulsifiers, such as those listed in McCutcheon's *Detergents and Emulsifiers*, 1973 Annual. Instead of the nonionic emulsifiers, nonionic detergents may sometimes be useful, especially those of the Neodol ® class, which are made by Shell Chemical Company. As examples of such compounds there may be named Neodol 25-7, Neodol 23-6.5 and Neodol 45-11, all of which are condensates of higher fatty alcohols and ethylene oxide. It is also possible to employ anionic emulsifiers and amphoteric emulsifiers, but cationic emulsifiers are generally avoided, because of their adverse reactions with anionic detergents that may be present in the wash water.

The aqueous medium for the liquid state wash cycle fabric conditioning compositions is preferably deionized water but tap water may also be employed, although it will preferably be such water of less than 100 parts per million hardness, as calcium carbonate.

It has been found that the antistatic composition may be given fabric softening characteristics by inclusion in the composition formula of a tertiary amine fabric softening agent, which also may improve the antistatic activity of the polyamides. Such a fabric softening tertiary amine will include at least one linear higher alkyl group of 10 to 18 carbon atoms and preferably will include two such groups, which may be different. A third alkyl or the remaining alkyls will be lower alkyl, of 1 to 4 carbon atoms, and preferably will be methyl. Thus, a highly preferred amine in such compositions is methyl di-(hydrogenated tallowalkyl) amine.

Preferred proportions of the components of the liquid composition are 5 to 20% of polyamide, preferably a neodecanamide, and more preferably Jeffamine T-403 polyoxypropylene trineodecanamide, or N,N'-ethylene-bis-neodecanamide, 5 to 20% of nonionic surface active agent, preferably Neodol 25-3 (the condensation product of higher fatty alcohol of 12 to 15 carbon atoms with three moles of ethylene oxide), 10 to 30% of tertiary amine, preferably methyl di-(hydrogenated tallow) alkyl amine, and 30 to 70% of an aqueous medium, preferably deionized water, although water-ethanol mixtures are also useful, wherein the water:ethanol ratio is in the range of 1:1 to 10:1.

To manufacture the particulate wash cycle fabric conditioning composition of this invention it is preferred to spray dry an aqueous crutcher mix containing 50 to 70% by weight of solids, usually constituted primarily of builder or builder plus filler material(s), in a commercial spray drying tower, at an elevated temperature, such as 250° to 400° C., to produce spray dried hollow globules or beads of particle sizes in the No's. 8 to 140 range, preferably 10 to 100 range, U.S. Sieve Series. Such spray dried beads may include other components of a finished additive composition, such as normal detergent composition adjuvants, including fluorescent brighteners, colorants, e.g., pigments, polymeric materials, dispersing agents (to prevent setting up of the crutcher mix during processing) and, sometimes, bentonite or a portion thereof. The polyamide is melted, often by being heated to 60° C., and is sprayed onto the surfaces of tumbling beds of the beads or is mixed with the beads, in an inclined drum mixer or other suitable mixer, such as a V-shaped twin shell blender. The balance of the bentonite of the formula may be agglomerated before mixing with the builder-polyamide combination or may be dusted onto such combination. Of course, the resulting product may be screened so that the particle sizes thereof are within a desired range.

To make the emulsion or other liquid product of the inventions it is only necessary to stir together the various components or to blend them together utilizing conventional mechanical or other suitable emulsifying equipment.

Using the wash cycle additive antistatic compositions is extremely simple and effective. All that is required is for the homemaker to add the desired amount of the wash cycle additive composition to the wash water in the tub of an automatic washing machine during the washing cycle, after the laundry, wash water and detergent composition of choice have been added, preferably after the detergent composition has been dissolved in the wash water. Normally the proportion of additive composition will be in the range of 0.1 to 2 grams per liter (g./l.), preferably 0.2 to 1.2 g./l., of a composition of this invention, either particulate or liquid. For a typical washing machine tub of 65 liters capacity the weight of additive employed will normally be in the range of 6.5 to 130 grams, preferably 13 to 78 grams, but for larger or smaller tubs the homemaker will soon learn from experience how much to employ to obtain best results.

After the fabric conditioning composition has been added to the wash water the standard wash cycle is commenced, followed by conventional rinsing, extracting (optional) and drying cycles, with the drying being in an automatic laundry dryer of the tumbling type (rotating drum). Even when the laundry being washed and dried includes synthetic polymeric fibers in the fabrics thereof, such as those made of polyester, polyether, acrylic and nylon fibers, and blends thereof, as with cotton, the washed and dried laundry is static-free.

With repeated uses of the invented compositions the homemaker can determine what quantity is best to use for household laundry and can adjust such amount to the minimum that will make the washed and dried laundry static free(and soft, if fabric softener is included). In some instances it may be found that even less than the minimum of the 0.1 to 2 g./l. range given above may be useful but for most cases it is considered that the charge of the additive composition should be in such range for satisfactory results.

The following examples illustrate but do not limit the invention. Unless otherwise indicated, all parts and percentages mentioned in these examples and in the specification and claims are by weight and all temperatures are in ° C.

EXAMPLE 1

| Component | Composition A (%) | B (%) |
|---|---|---|
| Pentasodium tripolyphosphate (as phosphate solids, after spray drying) | 66.4 | — |
| Zeolite A hydrate (22% moisture of hydration) powder (through No. 200 sieve, U.S. Sieve Series) | — | 36.3 |
| Sodium carbonate (soda ash) | — | 26.4 |
| Sodium bicarbonate | — | 14.0 |
| Sodium silicate (Na$_2$O:SiO$_2$ = 1:2.4) | 11.0 | — |
| Bentonite powder (Mineral Colloid 101, Georgia Kaolin Co.) | — | 1.7 |
| Sodium polyacrylate (molecular weight = 2,000) | — | 0.6 |
| Magnesium sulfate, anhydrous | — | 1.2 |
| Fluorescent brighteners and dyes | 1.6 | 1.1 |
| Water | 11.0 | 8.7 |
| Polyamide (TRI-DEC polyoxypropylene tri-neodecanamide[triamide of neodecanoic acid and Jeffamine T-403]) | 10.0 | 10.0 |
| | 100.0 | 100.0 |

To make the base beads of Composition A a 60% solids content aqueous crutcher mix containing the formula proportions of pentasodium tripolyphosphate, sodium silicate, fluorescent brightener and dye is made, heated to a temperature in the range of 70° to 95° C. and spray dried in a conventional spray drying tower, using heated drying air at a temperature in the range of 250° to 400° C., to hollow beads of globular shapes, which are within the particle size range of No's. 10 to 100, U.S. Sieve Series. Oversized particles and fines are screened out when necessary, so that this desired particle size range of product is obtained.

Onto 90 parts by weight of such spray dried base bead composition there are sprayed 10 parts by weight of liquid state polyamide (as described) at a temperature of 60° C. The polyamide antistatic agent covers the base beads and is partially (substantially) absorbed into the interiors of such beads, so that the particle size of the product resulting is not much different from that of the starting base beads, being in the 10 to 100 sieve range. After cooling to room temperature the product is found to be free flowing and non-caking on conventional storage before use.

The composition of Formula B is made in the same manner as described above for that of Forumula A, with all the components thereof except for the polyamide antistatic agent being in the crutcher mix, and with 10 parts of the polyamide in liquid state, being sprayed onto 90 parts of the base beads of the other components. The product is also free flowing and non-caking.

In use, 40 grams of Composition A are added to the wash water (65 liters) in the tub of a General Electric home laundry automatic washing machine, which wash water already contained 0.15% (98 grams) of a commercial built synthetic anionic organic detergent composition. Such detergent composition comprises 13.4% of sodium linear tridecylbenzene sulfonate, 24% of sodium tripolyphosphate, 6.3% of sodium silicate ($Na_2O$:$SiO_2$=1:2.4), 4.5% of sodium carbonate, 1.0% of borax, 0.3% of fluorescent brighteners, 0.5% of methyl cellulose, 0.2% of sodium carboxymethyl cellulose, 49.6% of sodium sulfate and 0.2% of perfume, on an anhydrous basis (8% water). The wash water is at a temperature of 49° C. and the laundry load is 3.6 kilograms of mixed laundry, in which there are present test fabric swatches of Dacron ®, Dacron-cotton blend, nylon and acrylic fabrics. After completion of the washing the washed laundry is rinsed and dried in an automatic laundry dryer of the type which incorporates a rotating drum having a substantially horizontal axis. After the completion of drying the laundry and test swatches are removed from the drum and are tested for static cling and for the presence of static charges thereon.

Compared to a control run, wherein the same type of laundry and test swatches are washed with the same type of detergent composition, but without the addition of the wash cycle additive antistatic composition, the test swatches are significantly better in preventing the accumulation of static charges and in preventing static cling. Also, the additive composition does not reduce the cleaning power of the detergent composition, because the polyamide, unlike quaternary ammonium halide softening agents, does not react with the anionic detergent, or with other components of the detergent composition.

It is considered that the description of the testing herein is sufficiently complete but if additional details are desired reference may be made to parent application Ser. No. 883,193, wherein in Example 5, at pages 31-33, test procedures that may be employed are described in greater detail.

The same test as described earler in this example is carried out with Composition B being employed as the wash cycle fabric conditioning additive composition instead of Composition A. Formula B is intended for use with wash waters containing detergent compositions that are free of phosphate, whereas Formula A, which contains phosphate, is intended for use with phosphate-built products. Accordingly, such a non-phosphate commercial detergent composition will be employed in the wash water instead of the anionic detergent composition previously described herein. Such a non-phosphate detergent composition may include the same percentages of components as in Formula B of the additive except for the replacement of the polyamide with synthetic organic nonionic detergent, preferably Neodol 25-7. The comparative results against the control (non-phosphate detergent alone, without the wash cycle additive) are essentially the same as those for Formula A against its control, with static and static cling being apparent on the control test swatches but not being present, or being significantly less, on swatches treated with the appropriate wash cycle additive of this invention. Similarly too, there is no reduction in cleaning power of the control caused by the employment of the wash cycle additive; in fact, due to the presence of additional builder, it is expected that such cleaning power will normally be increased. When a quaternary ammonium halide salt or composition is employed as a wash cycle additive, instead of the polyamide, in the compositions of this invention, measurable and significant decreases in detergency are noted.

In a modification of the experiments of this example, instead of the base beads being spray dried, the various solid components are mixed together in particulate form, and any liquid materials, other than polyamide, are mixed in or dried and then mixed with the other solids. If desired, some such materials may be agglomerated before such mixing. Subsequently, the polyamide, preferably in liquid form, is sprayed onto or mixed into the bed of particulate materials to produce the final additive compositions. Such compositions are equally satisfactory with respect to rendering the test swatches antistatic and non-clinging but are not as attractive in appearance and are not as good in flow properties and resistance to caking on storage as are the compositions based on spray dried base beads.

Instead of employing a major proportion of builder salt, some of such builder, up to about half the total, e.g., 10 to 50% thereof may be replaced by filler salts, such as sodium sulfate, without the desirable antistatic results being significantly adversely affected. Also, instead of TRI-DEC there may be substituted J-DEC or TRI-HEP or a mixture thereof (polyamides of reaction of Jeffamine D-400 and neodecanoic acid, and Jeffamine T-403 and neoheptanoic acid, respectively), and the swatches washed will also be antistatic. Similarly, other polyamides of the formulas previously given may be substituted and good antistatic results are achieved.

EXAMPLE 2

| Component | Composition C (%) | Composition D (%) |
| --- | --- | --- |
| Pentasodium tripolyphosphate (as phosphate solids, after spray drying) | 62.7 | — |
| Zeolite A hydrate (22% moisture of hydration) powder (through No. 200 sieve, U.S. Sieve Series) | — | 34.2 |
| Sodium carbonate (soda ash) | — | 25.0 |
| Sodium bicarbonate | — | 13.2 |
| Sodium silicate ($Na_2O$:$SiO_2$ = 1:2.4) | 10.4 | — |
| Bentonite powder (Mineral Colloid 101, Georgia Kaolin Co.) | — | 1.6 |
| Sodium polyacrylate (molecular | — | 0.5 |

-continued

| Component | Composition C (%) | D (%) |
|---|---|---|
| weight = 2,000) | | |
| Magnesium sulfate, anhydrous | — | 1.2 |
| Fluorescent brighteners and dyes | 1.5 | 1.1 |
| Water | 10.4 | 8.2 |
| E-DEC (N,N'—ethylene-bis-neodecanamide) | 15.0 | 15.0 |
| | 100.0 | 100.0 |

Wash cycle additive Compositions C and D are made in essentially the same manner as described for Compositions A and B in Example 1 and are tested in similar manners. However, it will be noted that Compositions C and D contain 15% of the polyamide and therefore the charge of 40 grams of such compositions to the wash waters delivers 6 grams of the polyamide instead of 4 grams of the more effective polyamide of Example 1. Compositions C and D make the washed and dried laundry antistatic and are superior in this respect to control compositions which do not contain the polyamide. Also, Compositions C and D are attractive products which are free flowing and non-caking.

Similar desirable antistatic action is obtained when instead of N,N'-ethylene-bis-nedecanamide in the compositions of the invention there is substituted N,N'-1,6-hexane-bis-neodecanamide. Similarly, when other amides, such as N,N'-ethylene-bis-neoheptanamide and N,N'-1,6-hexane-bis-neododecanamide are employed as the polyamide component of the invented compositions, the washed and automatic dryer dried laundry is low in static charge, despite its content of synthetic fibers and cotton-synthetic blends, and does not exhibit objectionable static cling.

EXAMPLE 3

| Component | Composition E (%) | F (%) |
|---|---|---|
| Pentasodium tripolyphosphate (as phosphate solids, after spray drying) | 51.8 | — |
| Zeolite A hydrate (22% moisture of hydration) powder (through No. 200 sieve, U.S. Sieve Series) | — | 28.3 |
| Sodium carbonate (soda ash) | — | 20.6 |
| Sodium bicarbonate | — | 10.9 |
| Sodium silicate (Na$_2$O:SiO$_2$ = 1:2.4) | 8.5 | — |
| Bentonite powder (Mineral Colloid 101, Georgia Kaolin Co., in spray dried base beads) | — | 1.4 |
| Sodium polyacrylate (molecular weight = 2,000) | — | 0.4 |
| Magnesium sulfate, anhydrous | — | 0.9 |
| Fluorescent brighteners and dyes | 1.3 | 0.8 |
| Water | 8.5 | 6.8 |
| Bentonite powder (Mineral Colloid No. 1) | 17.5 | 17.5 |
| Perfume | 0.4 | 0.4 |
| TRI-DEC (tri-amide of Jeffamine T-403 and neodecanoic acid) | 12.0 | 12.0 |
| | 100.0 | 100.0 |

Wash cycle additive Compositions E and F are made in essentially the same manner as described for Compositions A–D of Examples 1 and 2, and are tested in similar manners. The 16.6% of bentonite powder employed in Compositions E and F (in addition to the 1.3% earlier indicated for Composition F), may be agglomerated and mixed with the spray dried material before perfuming and spraying thereon of the polyamide, or may be dusted onto the base beads that have been sprayed or mixed with polyamide. Normally, the perfume is sprayed on last but exceptions may be made to this general rule, too. As in Examples 1 and 2, the E and F compositions are utilized with phosphate-containing built anionic synthetic organic detergent composition and with no-phosphate compositions, respectively. However, because it has been noticed that the presence of the bentonite appears to have some negative effect on the antistatic action of the polyamide in these products, more polyamide is in the E and F formulas than would otherwise be employed. Thus, instead of the 40 grams of additive composition utilized in Examples 1 and 2, 60 grams of the present formulas will be employed, which are equivalent to 7.2 grams per wash load of polyamide instead of the 4 grams per wash load of Example 1. Another change in the test procedure is in the inclusion of cotton test swatches for softness evaluations, which evaluations are made by a panel of experienced evaluators.

The same types of antistatic and fabric cling results reported for Example 1 are also obtained for the compositions of Example 3, and additionally, the cotton test swatches are found to be significantly softer to the touch for the experimentals than for the controls of this example (in which no wash cycle antistatic additive is employed).

EXAMPLE 4

| Component | Composition G (%) | H (%) |
|---|---|---|
| TRI-DEC (triamide of neodecanoic acid and Jeffamine T-403 polyoxypropylene triamine) | 11.5 | 9.3 |
| Nonionic surface active agent (Neodol 25-7) | 16.5 | 13.3 |
| Fabric softening tertiary alkyl amine [methyl di-(hydrogenated tallow) amine] | — | 19.5 |
| Water, deionized | 72.0 | 57.9 |
| | 100.0 | 100.0 |

The liquid emulsions of the above formulas are made by mixing together the various components in desired order. Preferably, the polyamide and amine, when present, are first mixed together with the nonionic surface active agent or emulsifier, before such mixture is added to the water. The emulsion made is of satisfactory stability but if a portion thereof should settle out, it may be redispersed therein by gentle shaking. The polyamide acts to diminish static charge accumulation of machine washed and automatically dried laundry and the amine helps to soften the laundry. The surface active agent acts as an emulsifier but also contributes detersive action to the wash water. The weight of wash cycle additives employed (added to 65 l. of wash waters), are 29 grams of Composition G and 36 grams of Composition H, so that the polyamide contents of both such charges are the same.

Compositions G and H prevent static charge accumulations on the swatches tested and Composition H additionally softens the laundry and the test swatches, especially the cotton swatches, compared to a control washing and drying, in which no wash cycle additive is employed.

In variations of the above formulas, others of the polyamides described in this specification may be substituted for the TRI-DEC polyamide and other neoalkanoic acids and polyamides may be employed in manufacturing the polyamides, and similar desirable antistatic effects will be obtained. Similarly, other fabric softening tertiary alkyl amines may be utilized, as described in the specification, and good fabric softening will result. Of course, instead of the nonionic surface active agent described, other emulsufiers and surface active agents may be employed, sometimes together with solvents and stabilizers, to improve emulsion stability and homogeneity of the additive product, and proportions may be varied within the ranges mentioned.

The invention has been described with respect to various illustrations and examples thereof but is not to be limited to these because it will be evident that one of skill in the art, with the present specification before him, will be able to utilize substitutes and equivalents without departing from the invention.

What is claimed is:

1. A wash cycle additive antistatic composition for treatment of laundry in wash water to make it antistatic after washing and automatic machine drying, which comprises an antistatic proportion, sufficient to impart antistatic characteristics to the laundry during washing when the wash cycle additive composition is charged to the wash water during the wash cycle at a concentration in the range of 0.1 to 2 g./l., of antistatic polyamide of trialkylacetic acid and polyamine, wherein the alkyls of the trialkylacetic acid moiety are of 1 to 10 carbon atoms each and the polyamine moiety contains from 2 to 5 amino groups, and a particulate carrier or liquid medium for the polyamide which is a detergent builder or filler suitable for building or filling a detergent, or is an aqueous medium containing a nonionic surface active agent.

2. A wash cycle additive composition according to claim 1 wherein the sum of the carbon atoms of the alkyls of each of the trialkylacetic acid moieties of the polyamide is from 3 to 12 and the polyamine moiety of the polyamide is a diamine or triamine moiety with alkylene group(s) of 2 to 10 carbon atoms and/or polyoxyalkylene alkylene groups connecting the amine groups of the polyamine, with the oxyalkylene of the polyoxyalkylene groups being of 2 to 4 carbon atoms, with the number of such groups in each polyoxyalkylene group being from 1 to 40, and with the alkylene groups of the polyoxyalkylene alkylene being of 1 to 10 carbon atoms.

3. A wash cycle additive composition according to claim 2 wherein the polyamide is a diamide of neodecanoic acid and alkylene diamine of 2 to 6 carbon atoms.

4. A wash cycle additive composition according to claim 2 wherein the polyamide is of a formula selected from the group consisting of

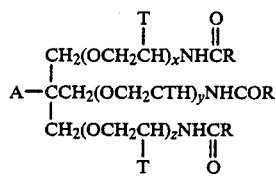

and

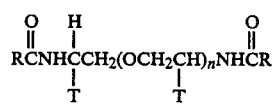

wherein A is selected from the group consisting of alkyl of 1 to 20 carbon atoms and hydrogen, T is selected from the group consisting of methyl and hydrogen, R is a neoalkyl of 4 to 13 carbon atoms, n is from 1 to 40, and x, y and z are each numerals from 1 to 8, and total from 4 to 10.

5. A wash cycle additive composition according to claim 4 wherein the polyamide is of the formula

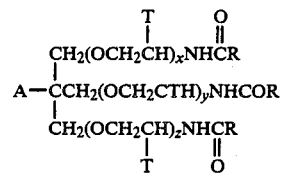

wherein A is an alkyl of 1 to 4 carbon atoms, T is methyl, R is a neoalkyl of 4 to 9 carbon atoms, and x, y and z are each numerals from 1 to 3, which total from 4 to 8.

6. A wash cycle additive composition according to claim 5 wherein in the formula of the polyamide A is ethyl, R is neoalkyl of about 9 carbon atoms and x, y and z are each numerals from 1 to 3, the total of which averages about 5.3.

7. A wash cycle additive composition according to claim 4 wherein the polyamide is of the formula

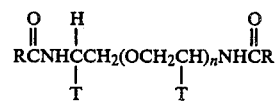

wherein T is methyl, R is neoalkyl of 4 to 9 carbon atoms and n is in the range of 2 to 10.

8. A wash cycle additive composition according to claim 7 wherein in the formula of the polyamide R is a neoalkyl of about 9 carbon atoms and n is about 5.6.

9. A wash cycle additive composition according to claim 3 which is N,N'-ethylene-bis-neodecanamide.

10. A wash cycle additive composition according to claim 1 wherein the proportion of antistatic compound present is 5 to 30%, by weight.

11. A wash cycle additive composition according to claim 10 which is in particulate form and which comprises 5 to 30% of polyamide selected from the group consisting of N,N'-ethylene-bis-neodecanamide and

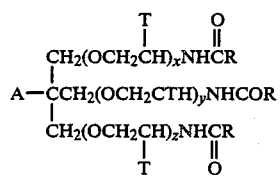

wherein A is ethyl, R is neoalkyl of about 9 carbon atoms, T is methyl and x, y and z are each numerals from 1 to 3, the total of which averages about 5.3, and 50 to 95% of particulate builder salt which is a polyphosphate, carbonate, bicarbonate, sesquicarbonate, silicate, sesquisilicate, polyacetal carboxylate, borate, zeolite or mixture thereof.

12. A composition according to claim 11 of improved fabric softening capability, which comprises from 5 to 25% of the antistatic polyamide(s), 10 to 25% of bentonite and 50 to 80% of builder, which is a polyphosphate, carbonate, bicarbonate, silicate or zeolite, or a mixture thereof.

13. A composition according to claim 11 wherein the antistatic polyamide is of the formula

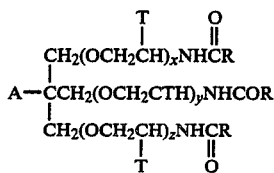

wherein A is ethyl, R is neoalkyl of about 9 carbon atoms, T is methyl and x, y and z are each numerals from 1 to 3, the total of which averages 5.3, and the carrier is spray dried detergent builder beads of particle sizes in the No's. 10 to 100 sieve range, U.S. Sieve Series, and the antistatic polyamide coats and penetrates the spray dried beads of the carrier.

14. A composition according to claim 11 wherein the antistatic polyamide is N,N'-ethylene-bis-neodecanamide.

15. A wash cycle additive antistatic composition according to claim 2 which is in liquid form and which comprises 5 to 20% of antistatic polyamide, 5 to 20% of nonionic surface active agent, 10 to 30% of a tertiary amine fabric softening agent and 30 to 70% of an aqueous medium.

16. A composition according to claim 15 in which the antistatic polyamide is of the formula

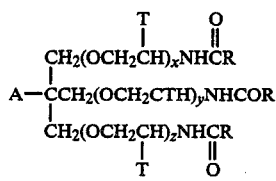

wherein A is ethyl, R is neoalkyl of about 9 carbon atoms, T is methyl and x, y and z are each numerals from 1 to 3, the total of which averages 5.3, the tertiary amine fabric softening agent is a mono-lower alkyl di-(hydrogenated tallow) amine, and the aqueous medium is water.

17. A composition according to claim 15 wherein the antistatic polyamide is N-N'-ethylene-bis-neodecanamide.

18. A process of manufacturing a composition of claim 1 which comprises spraying liquid state antistatic polyamide onto the surfaces of or mixing such liquid state material with particulate builder or filler salt of particle sizes in the range of No's. 10 to 100, U.S. Sieve Series, which particulate material is a polyphosphate, carbonate, bicarbonate, sesquicarbonate, silicate, sesquisilicate, polyacetal carboxylate, borate, sulfate, zeolite or mixture thereof, so as to form a free flowing, particulate wash cycle additive antistatic composition.

19. A process for making laundry resistant to accumulations of static charges which otherwise would be present after washing of the laundry in an automatic washing machine and drying it in an automatic laundry dryer, which comprises adding to wash water in said washing machine during the wash cycle a fabric softening quantity of antistatic polyamide of trialkylacetic acid and polyamine, wherein the alkyls of the trialkylacetic acid moiety are of 1 to 10 carbon atoms each and the polyamine moiety contains from 2 to 5 amino groups.

20. A process for making laundry resistant to accumulations of static charges which otherwise would be present after washing of the laundry in an automatic washing machine and drying it in an automatic laundry dryer, which comprises adding to wash water in said washing machine during the wash cycle 0.1 to 2 g./l. of a composition described in claim 1.

* * * * *